UNITED STATES PATENT OFFICE.

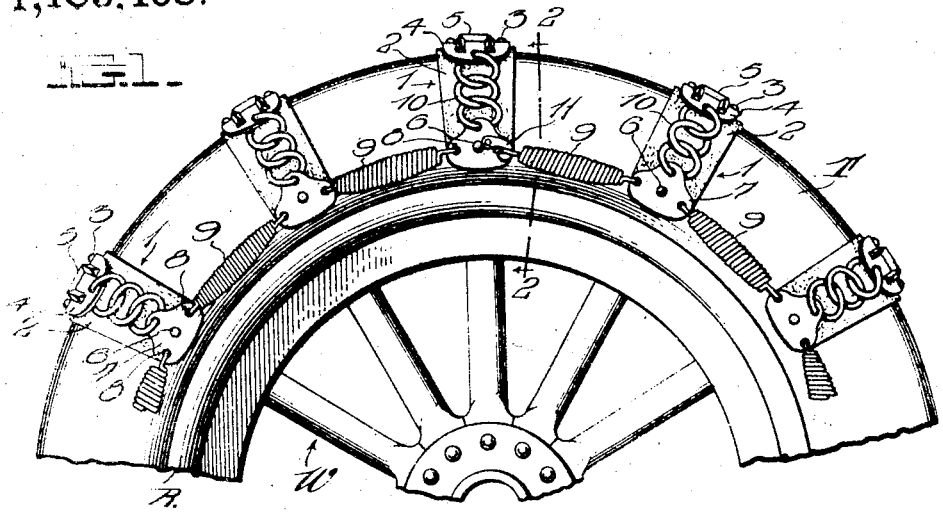
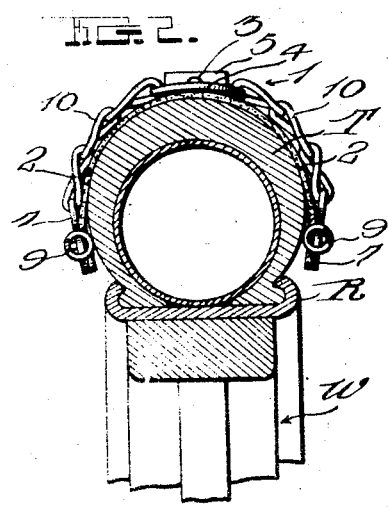
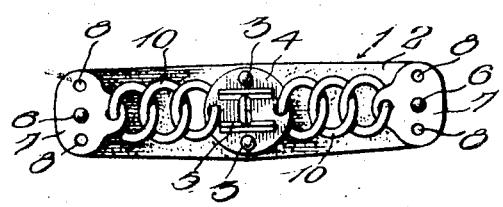
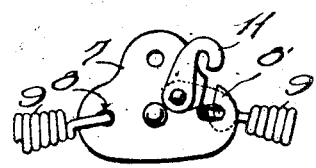
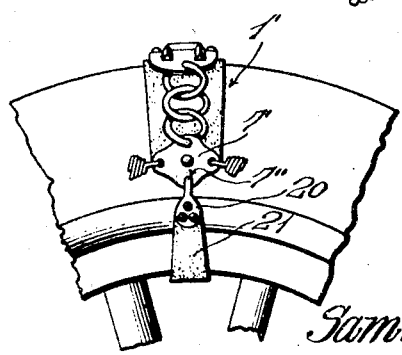

SAMUEL HUNTER, OF SYRACUSE, NEW YORK.

TIRE-ARMOR.

1,163,408.  Specification of Letters Patent.  Patented Dec. 7, 1915.

Application filed January 11, 1915. Serial No. 1,624.

*To all whom it may concern:*

Be it known that I, SAMUEL HUNTER, a citizen of the United States, residing at Syracuse, in the county of Onondaga and State of New York, have invented certain new and useful Improvements in Tire-Armors; and I do declare the following to be a full, clear, and exact description of the invention, such as will enable others skilled in the art to which it appertains to make and use the same.

My invention relates to improvements in tire armors and has for its object to provide a device of this character which may readily be applied to any tire, which will be simple in construction, efficient in operation, and which although having a number of anti-skid chains, will not mutilate the tire in any manner.

In reducing the invention to an operative structure, I employ certain novel features of construction and combination hereinafter described and claimed and shown in the drawings, wherein:

Figure 1 is a side elevation of a portion of an automobile wheel and tire, showing the application of the invention thereto; Fig. 2 is a transverse section as seen on the line 2—2 of Fig. 1; Fig. 3 is a plan view of one of the units of which the armor is constructed; Fig. 4 is an enlarged side elevation showing more particularly the construction of the connecting means employed for uniting the two ends of the armor, and Fig. 5 is a view similar to Fig. 1 but showing a slightly different form of construction.

In these drawings, constituting a part of this application, an automobile wheel W having the usual rim R is shown, this rim being equipped with an appropriate type of pneumatic tire T, which it is the object of the present invention to protect against skidding and also against a considerable amount of wear. To this end, an armor is provided which is formed of a number of independent units preferably connected by coiled springs.

In Figs. 1 to 4 inclusive, each unit 1 of the armor is shown as comprising a flat strip 2 of pliable material, such for instance as leather or reinforced rubber, these strips being, in practice, approximately two inches in width and of a length sufficient to embrace the tread and sides of the tire. Secured by a pair of rivets 3 to the center of the strip 2 is a flat rigid wear plate 4 which may be of any appropriate design and which is preferably curved to conform to the curvature of the tire. Furthermore, the plate 4 is equipped with any suitable form of projection 5 adapted to assist in preventing skidding and to constitute an effective grip for engagement with the road bed. Secured by rivets 6 to the opposite ends of the strip 2, is a pair of end plates 7 which likewise may be of any appropriate design, the outer side edges of these end plates being here shown as provided with openings 8 for the reception of a plurality of suitably shaped eyes formed on the opposite ends of coiled springs 9 by means of which the various units of the device are connected. As most clearly shown in Fig. 3, the inner opposed edges of the wear and end plates 4 and 7 respectively, are also provided with openings, these openings receiving the endmost links of a pair of flat chains 10 which overlie the opposite end portions of the strip 2, these chains being here shown as of slightly less width than the width of the strip 2.

For the purpose of rendering the armor attachable and detachable, the end plates 7 of one of the units 1, rather than being provided with two openings 8 is provided with one such opening in one of its side edges and with a hook 8' in its other side edge, the bill of this hook overlying its shank as clearly shown in Fig. 4. Coacting with the hook 8' is a second hook 11 whose shank is pivoted to the plate in question at a point spaced upwardly from the hook 8', the bill of this hook 11 underlying its shank for a considerable distance as shown. By this construction, the eye on the adjacent spring 9 may be hooked over the hook 8' when the hook 11 is raised, after which this hook 11 may be swung downwardly and likewise engaged with said eye, when the latter is moved a sufficient distance inwardly upon the shank of the hook 8' to allow the bill of this hook 11 to enter the eye. When the spring is then released, the pivoted hook will be effectively retained in its active position until it is manually released.

From the foregoing description, taken in connection with the accompanying drawings, it will be seen that a very efficient tire armor has been provided, yet one which will be very simple in construction and which may be inexpensively marketed.

The various parts of the device may be made of any appropriate material for correctly performing their functions, such material being unessential in so far as the present application is concerned.

As additional means for securing the armor to the wheel and tire, I may employ the construction shown in Fig. 5 if desired, in which case, the units 1' of the armor are equipped with end plates 7' constructed in the manner above set forth, but being further provided with openings 7'' in their inner edges which receive appropriate fasteners 20 carried by the ends of straps or stirrups 21 which pass around the rim R as clearly shown in this figure.

I claim as my invention:

1. In a tire armor, a unit comprising a flat pliable strip adapted to be positioned transversely upon a tire, a metal wear plate secured to the center of the strip on its outer surface, flat metal end plates secured to the ends of said strip on said outer surface, and chains overlying the opposite portions of said strip and secured at their ends to the wear and end plates, in combination with a plurality of similar units, and circumferentially extending elements connecting the same.

2. In a tire armor, a unit comprising a flat strip of pliable material to be positioned transversely upon a tire, a rigid wear plate secured to the center of said strip on its outer surface, a pair of flat rigid end plates secured one to each end of the strip on said outer surface, the inner facing edges of the wear and end plates having openings, and the outer side edges of the end plates likewise having openings, and a pair of flat chains overlying the opposite end portions of the strip between the wear and end plates and having their endmost links passed through the openings in the inner opposed edges thereof, in combination with a plurality of similar units, and circumferentially extending elements having their ends secured in the openings in the outer side edges of the end plates.

In testimony whereof I have hereunto set my hand in presence of two subscribing witnesses.

SAMUEL HUNTER.

Witnesses:
ROBERT R. PATTERSON,
VERNON A. HUNTER.